United States Patent
Galicia

[11] 3,890,234
[45] June 17, 1975

[54] OIL SEPARATION AND RECOVERY DEVICE

[76] Inventor: Frank Galicia, 5043 Catherine St., Philadelphia, Pa. 19143

[22] Filed: Apr. 18, 1973

[21] Appl. No.: 352,209

[52] U.S. Cl. .......... 210/242; 210/DIG. 21; 210/194
[51] Int. Cl. .......................................... E02b 15/04
[58] Field of Search ............... 210/83, 65, 242, 194, 210/DIG. 21, 521, 522

[56] References Cited
UNITED STATES PATENTS

| | | | |
|---|---|---|---|
| 386,114 | 7/1888 | Donahue | 210/522 |
| 3,521,756 | 7/1970 | Kammsky | 210/521 |
| 3,615,017 | 10/1971 | Valdespino | 210/DIG. 21 |
| 3,630,376 | 2/1971 | Price | 210/DIG. 21 |
| 3,635,342 | 1/1972 | Mourlon et al. | 210/DIG. 21 |
| 3,661,264 | 5/1972 | Peterson et al. | 210/DIG. 21 |
| 3,666,099 | 5/1972 | Galicia | 210/242 |
| 3,667,610 | 6/1972 | Daniel | 210/DIG. 21 |
| 3,715,034 | 2/1973 | Ivanoff | 210/DIG. 21 |
| 3,726,406 | 4/1973 | Damberger | 210/242 |
| 3,741,391 | 9/1973 | Donsbach | 210/DIG. 21 |
| 3,754,653 | 8/1973 | Verdin | 210/DIG. 21 |

*Primary Examiner*—Theodore A. Granger
*Attorney, Agent, or Firm*—Woodcock, Washburn, Kurtz & Mackiewicz

[57] ABSTRACT

An oil separation and recovery device which may be towed or otherwise propelled over, or left stationary on, the surface of a body of oil polluted water. If the unit is in motion, inverted V-shaped troughs intersect the liquid surface causing the oil polluted water to flow into an inner chamber as the oil rises to the trough vertices. If stationary, high pressure water is used to force the oil polluted water along the troughs to the inner chamber as a vacuum is created. In either case, but particularly the latter, the contaminated water flow path is improved by utilizing depolluted discharging water to induce a surface current of the oil polluted water to flow toward the troughs. Also, the utilization of a heating means keeps the oil flowing expeditiously through the troughs.

1 Claim, 9 Drawing Figures

PATENTED JUN 17 1975 3,890,234

SHEET 1

3,890,234

OIL SEPARATION AND RECOVERY DEVICE

CROSS REFERENCE TO CO-PENDING APPLICATIONS

This application is related to applicant's copending applications Ser. No. 352,208 filed Apr. 18, 1973 entitled "Rotary Oil Recovery Device with Non-Integral Collecting Head" and Ser. No. 352,210 filed Apr. 18, 1973 entitled "Oil Collection Device."

BACKGROUND OF THE INVENTION

The subject invention is directed to a mechanical device which may be used for removing and collecting oil from bodies of water where oil slicks have resulted from marine accidents or other causes. Considerable attention has been focused on developing mechanical oil recovery devices in lieu of chemical removal techniques largely because of the advantages the mechanical approach offers. Thus, the oil recovered may be used, although unless it is a very crude oil, it must first be reprocessed; and potential danger of pollution resulting from the use of various chemicals is eliminated.

The subject invention is an improvement over a particular embodiment disclosed in applicant's U.S. Pat. No. 3,666,099 which issued May 30, 1972. While that patent discloses a useful mechanical oil recovery device which is of substantial value, nevertheless, as disclosed in the subject application, a number of improvements have been made to produce a device capable of even superior performance.

Of critical importance with this general type of design is the ability to channel the contaminated water into the inverted V-shaped troughs and to ensure that it then flows expeditiously to the collecting chamber. Thus, applicant has been concerned with improving the flow path of the contaminated water which the subject invention accomplishes.

SUMMARY OF THE INVENTION

Accordingly, it is an object of the subject invention to provide a separation device utilizing inverted V-shaped troughs for removing a less dense liquid from a more dense one in which the flow and separation characteristics are improved over prior devices of this nature.

It is a further object of the subject invention to provide an oil collection and recovery device which may be towable, in which the flow path of the contaminated liquid, before it enters a separation chamber, is substantially improved to facilitate separation.

It is another object of the subject invention to provide an oil collection and recovery device in which depolluted water is used as a means to induce a surface current of oil polluted water to flow toward the intake section of the device.

It is yet another object of the subject invention to provide an oil collection and recovery device in which the flow characteristics of the contaminated liquid are further improved by using a heating means along part of the path of travel to improve oil fluidness.

It is a further object of the subject invention to provide an oil collection and recovery device in which channelized low pressure steam is used to heat the oil along part of its path of travel, to improve the flow characteristics thereof.

It is still another object of the subject invention to provide an oil collection and recovery device which may be either towable or which may be used in a stationary position.

It is another object of the subject invention to provide an oil collection and recovery device in which jets of water under pressure are used to force floating oil downwardly through the oil-water interface and into a receiving chamber.

In accordance with the above objects, the subject invention has been designed to improve performance standards of earlier mechanical oil recovery and collection devices, namely the type disclosed in my U.S. Pat. No. 3,666,099. While the collection and recovery device may be towable or may be propelled by a small craft or other means to skim along the surface of the water, it may also be used in a stationary position. If towed, the inverted V-shaped troughs are designed to impact against the water and as a result of their inclined structure, the contaminated water flows downwardly through the water-oil interface with the oil rising to the trough vertices because of its buoyancy, and into a collection tank where further separation occurs. If the device is motionless, jets of water are used to force the oil downwardly along the inverted V-shaped troughs and into the separation chamber. Once in the chamber, the oil rises and is then pumped out to an oil storage means. The relatively depolluted water is forced downwardly, by the pressure of the following liquid, through an egress duct where it is discharged from a vent forwardly of the inverted V-shaped troughs and below the water surface. Expelling the relatively depolluted water in this manner serves to induce a current in the oil polluted surface water causing it to flow toward the inverted V-shaped troughs. This induced current is particularly beneficial when the device is used in the stationary position.

To further improve the flow characteristics of the contaminated water, low pressure steam is piped to the recovery device from another source and may be fed through confined V-shaped channels created opposite the inverted V-shaped troughs.

DETAILED DESCRIPTION

Figure 1:
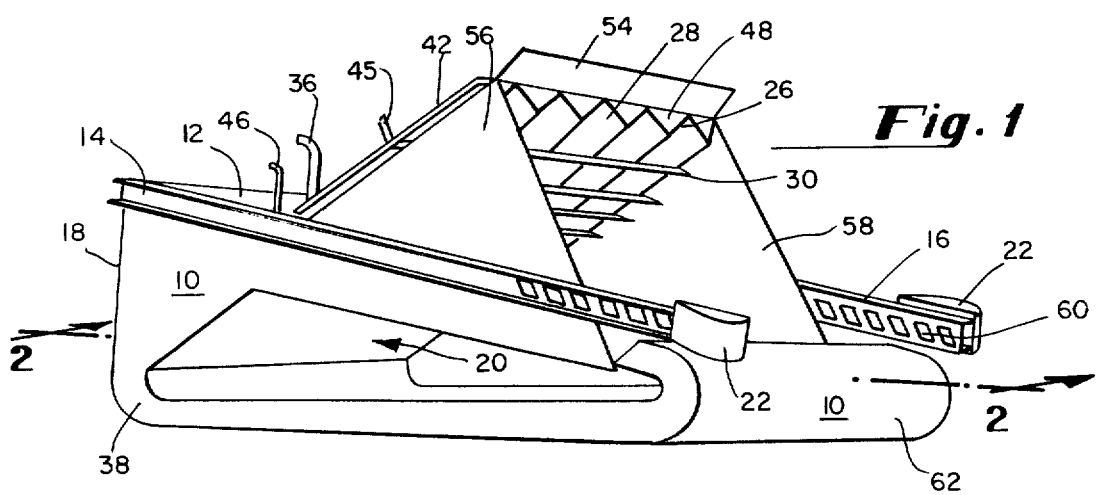
FIG. 1 is a perspective view of the towable oil separation and recovery device.
Figure 2:
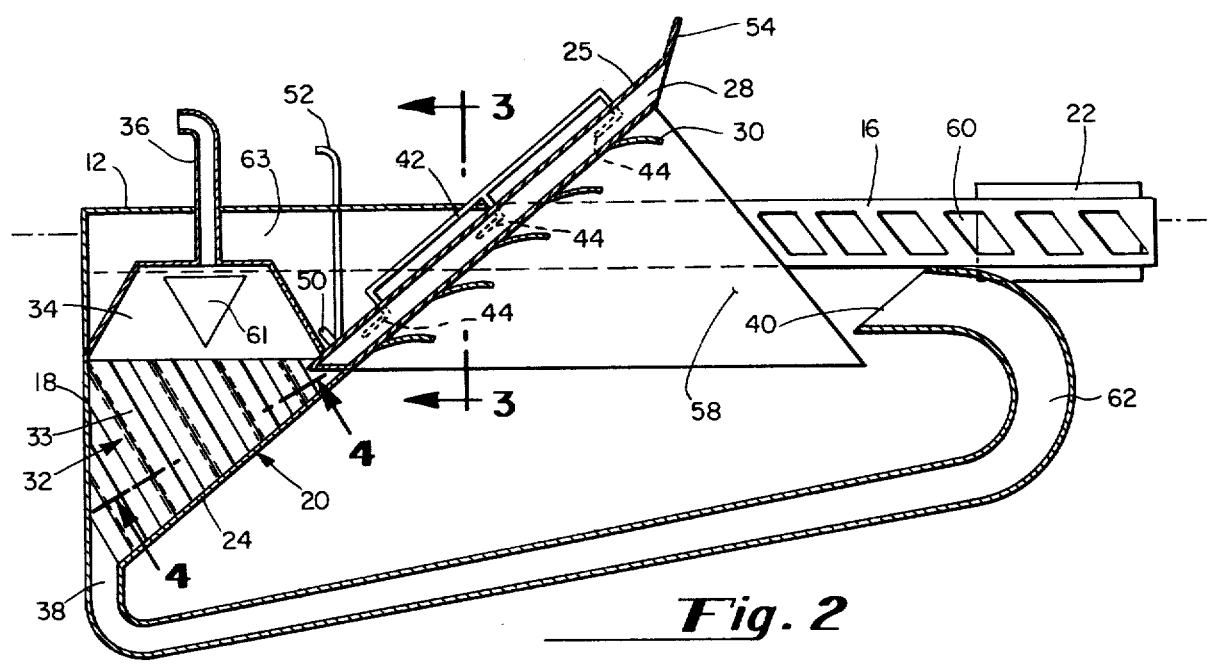
FIG. 2 is a side sectional view of the recovery device taken along the line 2—2 of FIG. 1.
Figure 3:
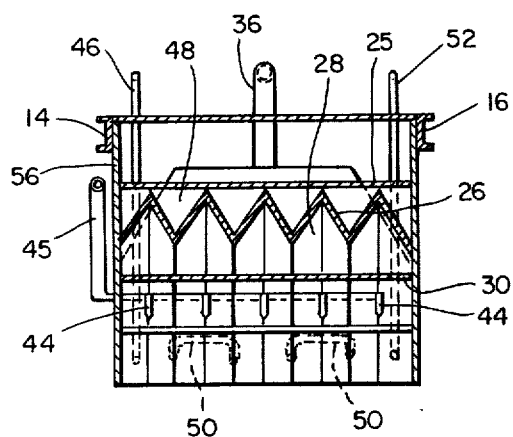
FIG. 3 is an end sectional view of the recovery device taken along line 3—3 of FIG. 2.

With reference to FIGS. 1–3, the improved recovery and separation device is shown. If the device is towed, oil polluted water will be intercepted and channeled into a separation chamber where the oil will be pumped to containment means and the then depolluted water will be ejected. If the device is stationary, water pressure will be used to force oil polluted water into the separation chamber and the depolluted water will be used to induce a surface current of more oil polluted water toward the channeling means to the separation chamber.

In particular, the recovery and separation device 10 is floatable and comprises a deck portion 12 with side members 14 and 16 extending the length of the device. Depending from the deck portion 12 is a stern transom 18 which defines part of the separation chamber which will be described subsequently. A composite keel plate 20 extends upwardly, a part of which further defines the chamber as will be described. At the forward extremities of the side members 14 and 16 buoyancy tanks 22 serve to keep the craft afloat when stationary.

Figure 4:
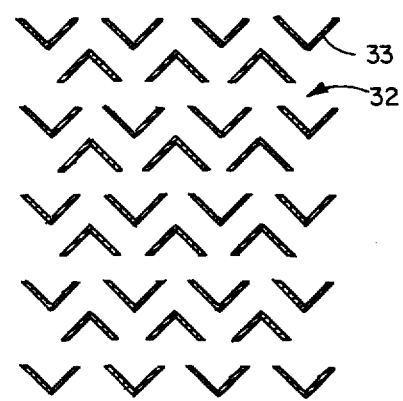
FIG. 4 is a sectional view of the lower separation chamber taken along line 4—4 of FIG. 2.
Figure 4A:
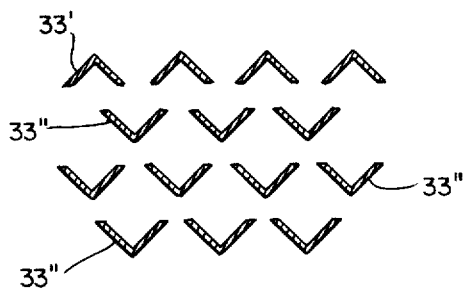
FIG. 4A is a sectional view of a pattern of troughs which may be used in place of the troughs shown in FIGS. 2 and 4.

The composite keel plate 20 comprises a lower portion 24 which serves as a wall of the chamber to be described and an upper portion 25 from which depend narrow strip-like portions 26 in corrugated fashion which extend fore and aft along the device angulated to the horizontal plane of deck 12 to define inverted V-shaped troughs or channels 28. Baffles 30 extend transversely of the strip-like portions 26 and are angled downwardly to restrict the eddying effects of the water leaving the troughs 28 as the less dense liquids pass rearwardly and downwardly within said troughs 28 to the chamber. The separation chamber 32 is in the area defined by the lower portion of the keel plate 24 and the stern transom 18. The separation chamber 32 has an upper portion 34 to which is connected an oil recovery pipe 36 used for pumping out the oil. The chamber 32 has in its lower portion a series of V-shaped plates 33 through which the incoming mixture flows as shown in FIG. 4. A modified form is shown in FIG. 4A where top plate 33' is used to dampen and retard the incoming flow of oil while the other plates 33" serve to allow the oil to readily rise to upper portion 34 of the chamber because of its buoyancy and the pressure of following liquid.

As best seen in FIG. 2, duct 38, of which there may be several (see FIG. 6), extends from the base of chamber 32 and rises upwardly and forwardly terminating in vent 40 positioned forward of and below where the water surface will intersect keel plate 24. Depolluted water flows through duct 38 to induce a surface current in the contaminated water as it is expelled from vent 40.

An inlet pipe 45 receives water from an external source which, by means of distribution pipes 42, flows to jets 44. These are positioned to eject a high pressure stream of water downwardly into the vertices of the inverted V-shaped troughs 28 to force oil polluted water downwardly when the recovery device is left in a stationary position. The jets 44 positioned as they are also create a vacuum or suction effect on the polluted surface water and draw it into the inverted V-shaped troughs.

Inlet port 46 is connected to an external source and receives steam at low pressure which is then fed through the triangle channels 48 which are created between the upper keel plate 25 and the strip-like members 26. Near the base of triangular channels 48 are a series of channel coupling pipes 50 which are connected to succeeding channels 48 to circulate the steam until it reaches outlet port 52 for reheating and recirculation.

As best seen in FIGS. 1 and 2, a keel splash plate 54 extends upwardly at an angle above the top of the troughs 28. Side members 56 and 58 depend from the keel plate upper portion 25 downwardly to a point below side members 14 and 16 and assist in channeling the polluted water flow. Side members 14 and 16 have apertures 60 which serve to lighten the device and prevent any undue influence from waves and rough seas. It will also be noted that duct 38 has a curved portion 62 at its most forward part to provide a more streamlined profile in the event it is towed during operation and to make towing it to its point of operation easier. Buoyancy tanks 61 and 63 as aided by tanks 22 serve to keep the device afloat.

Figure 5:
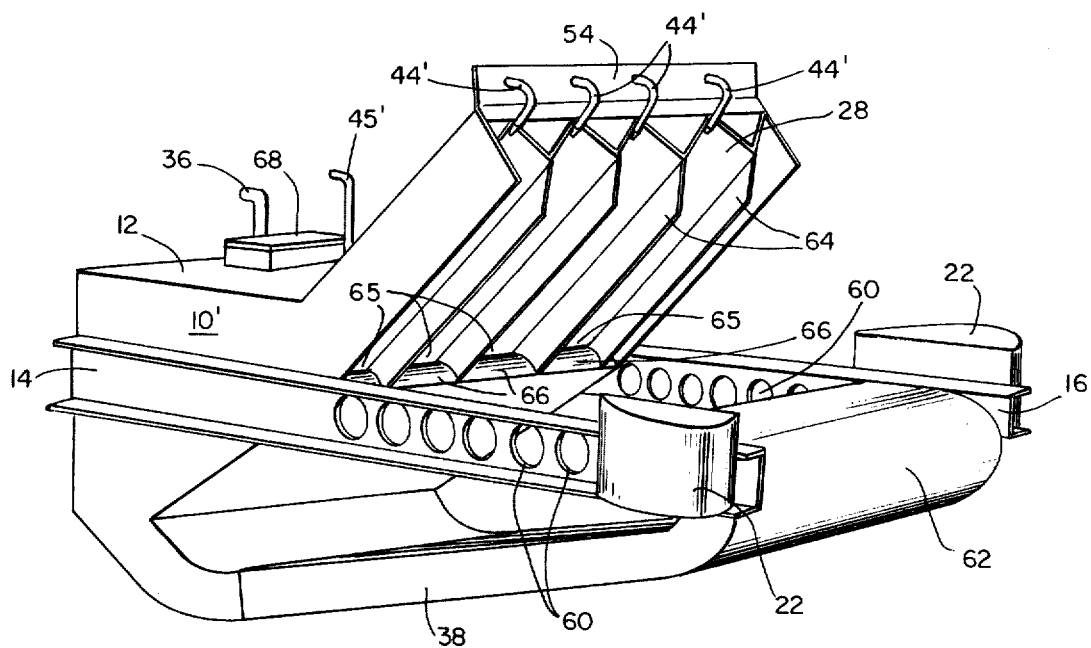
FIG. 5 is another perspective view showing an alternate recovery device featuring modified inverted V-shaped troughs.

With reference to FIG. 5, a variation in the design is shown with one of the prime changes being the elimination of the cross baffles 30 in device 10' and the use of depending plates 64 to better channel the oil polluted water downwardly into the separation chamber through ports 65 adjacent top portion of lower keel plate 66. Extended side panels 56 and 58 of FIG. 1 are eliminated in the embodiment of FIG. 5 since the plates 64 provide the necessary channeling.

Figure 6:
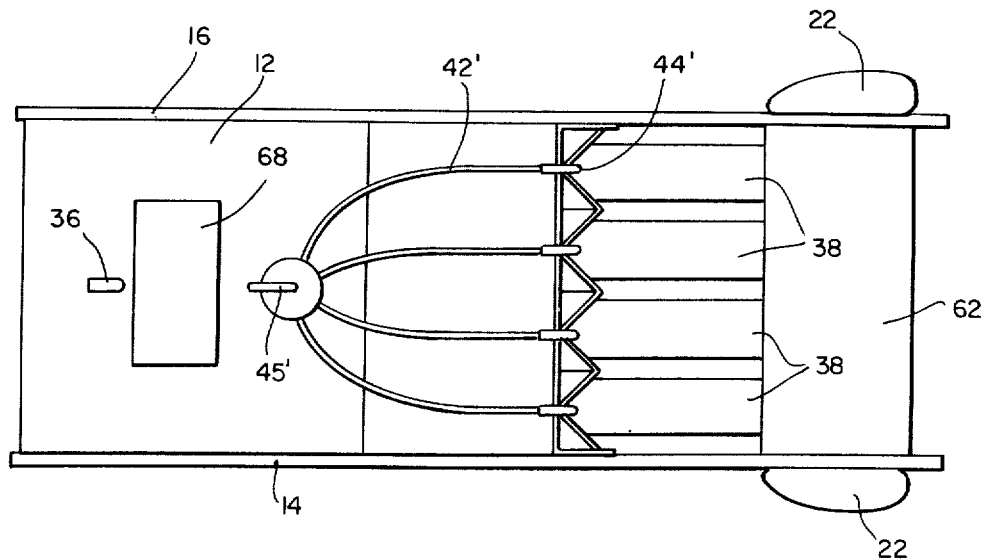
FIG. 6 is a top view of the recovery device of FIG. 5.

As best seen in FIG. 6, an alternate water jet system is shown. Distribution pipes 42' deliver the water from inlet pipe 45' to jets 44' which are secured on splash plate 54 and not placed along the troughs 28 at intervals as shown in FIG. 2. FIG. 6 shows four ducts 38 which are used to channel the depolluted water to the discharge points.

Figure 7:
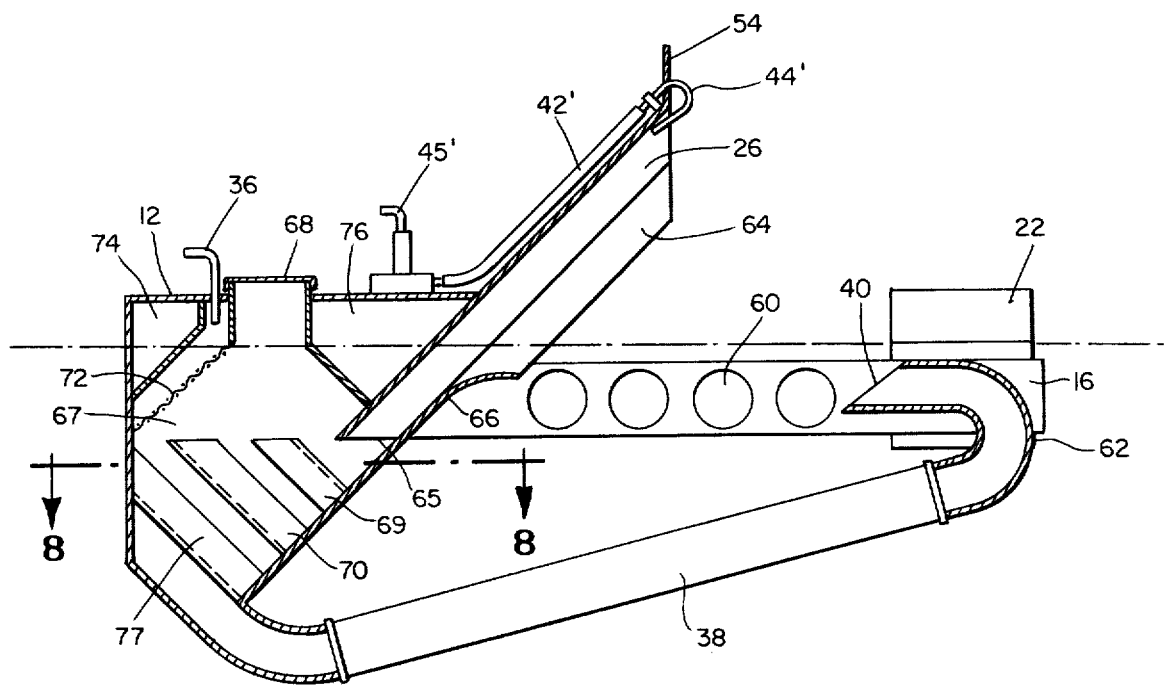
FIG. 7 is a side sectional view of the recovery device of FIG. 5 taken through its center.
Figure 8:
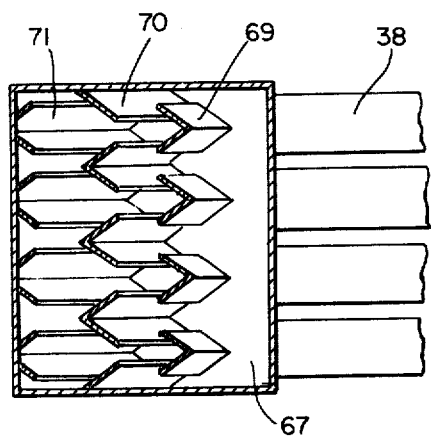
FIG. 8 is a top sectional view of the device of FIG. 5 taken along lines 8—8 of FIG. 7 in a manner to emphasize the positioning of the troughs within the separation chamber.

As shown in FIGS. 7 and 8, a modified separation chamber 67 is provided. Access is obtained to the chamber 67 through hatch lid 68 located on deck 12. The lower portion of the chamber has three series of V-plates 69, 70 and 71. Plates 69 are positioned so that oil polluted water flowing downwardly through ports 65 impacts against the plates 69 which serve to break its force. Lower inverted plates 70 and 71 then serve to separate the oil from the water as the more buoyant oil rises to the top of chamber 67 where it passes through filtering screen 72 to be pumped out through outlet pipe 36. The depolluted water passes through channels 38 as previously described. Compartments 74 and 76 are buoyancy tanks.

In operation, the recovery device 10 or 10' approximates a profile as shown in FIG. 2 when it is floating in the water, the approximate level of which is indicated by the water line at the craft extremities. The device is kept afloat by buoyancy tanks 22, 61 and 63 in the case of the embodiment of FIG. 1 and tanks 22, 74 and 76 in the case of the embodiment of FIG. 5. If the device is towed or propelled from the rear, the contaminated water impacts against the troughs 28 and cross baffles 30 and the water which is discharged through jets 44 at high pressures aids in forcing the oil polluted surface water to within the inverted V-shaped troughs 28 from where it is flushed into the separation chamber 32, or 67 by succeeding water. At this time, the oil rises because of its buoyancy to the upper portion of the chamber where it is pumped out through oil recovery pipe 36. As this is happening, and the relatively depolluted water is settling to the bottom of chamber 32 or 67, the following intake will force the depolluted water through duct 38 and out vent 40. As this water is discharged, it induces a surface current of the oil polluted water to flow to the trough impact area.

If the device 10 or 10' is operated in a stationary position, the flow of the oil polluted water to the inverted V-shaped troughs 28 and thence downwardly into the separation chamber 32 or 67 is occasioned solely by the force and suction effect caused by jets 44 or 44' and the surface current induced by the discharging depolluted water from vent 40.

To expedite the passage of heavy viscous oil through the inverted V-shaped troughs 28, the troughs may be heated by low pressure steam which is fed to the device through inlet port 46 and travels through the triangular channels 48.

As the oil is pumped to the accompanying vessel, it may be stored and then reprocessed for future use. In the case of crude oil, it may be in satisfactory condition as received, and returned directly to crude oil supplies.

With respect to the embodiment of FIG. 5, the modified trough arrangement with plates 64 helps to channel the water and prevent eddying in much the same fashion as the cross bevels 30.

While various embodiments of the invention have been shown and described, it will be understood that various modifications may be made. The appended claims are, therefore, intended to define the true scope of the invention.

I claim:

1. A float-supported device for separating two liquids of different densities forming a liquid interface, including:

float-supported troughs comprising angularly arranged elongated structures presenting a channel substantially inverted and V-shaped in transverse section, a separation chamber in fluid communication with the lower portion of said angularly arranged elongated structures to receive liquid collected by said elongated structures, duct means with a first end in communication with a lower end of said separation chamber and a second end constructed and arranged adjacent the inverted V-shaped side of said angularly arranged elongated structures whereby heavier liquid discharged from said separation chamber is discharged in the direction of said elongated structures to induce the flow of liquid to be separated towards said troughs.

* * * * *